(12) United States Patent
Wong et al.

(10) Patent No.: US 11,216,398 B2
(45) Date of Patent: Jan. 4, 2022

(54) USB DEVICE AND DATA TRANSFER METHOD THEREOF

(71) Applicant: REALTEK SEMICONDUCTOR CORPORATION, Hsinchu (TW)

(72) Inventors: Er-Zih Wong, Taichung (TW); Zhen-Ting Huang, Yunlin County (TW); Shih-Chiang Chu, Taipei (TW); Sung-Kao Liu, Hsinchu (TW); Chia-Yi Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/801,223

(22) Filed: Feb. 26, 2020

(65) Prior Publication Data
US 2020/0272587 A1 Aug. 27, 2020

(30) Foreign Application Priority Data
Feb. 27, 2019 (TW) ................................. 108106772

(51) Int. Cl.
*G06F 13/26* (2006.01)
*G06F 13/16* (2006.01)

(52) U.S. Cl.
CPC .......... *G06F 13/26* (2013.01); *G06F 13/1668* (2013.01); *G06F 2213/0042* (2013.01)

(58) Field of Classification Search
CPC combination set(s) only.
See application file for complete search history.

(56) References Cited

U.S. PATENT DOCUMENTS 7,516,269 B2 * 4/2009 Hong .................... G06F 3/0605
                                                            711/103
9,210,086 B2   12/2015 Chen et al.
(Continued)

FOREIGN PATENT DOCUMENTS

CN    103875302 B    10/2017
TW    201351159 A    12/2013
TW    201435597 A    9/2014

OTHER PUBLICATIONS

OA letter of the counterpart TW application (appl. No. 108106772) dated Mar. 23, 2020. Summary of the OA letter: 1. The specification is objected to under Taiwan Patent Law Article 26(1) as being indefinite. 2. Claims 1,4-5 and 10 are rejected under Taiwan Patent Law Article 26(2) as being indefinite. 3. Reference 1 (TW 201435597) renders claim 1-3 and 5-10 obvious. 4. References 1 (TW 201435597) and 2 (TW 201351159 A) render claim 4 obvious.

(Continued)

*Primary Examiner* — Henry Tsai
*Assistant Examiner* — Juanita Borromeo
(74) *Attorney, Agent, or Firm* — WPAT, PC

(57) ABSTRACT

The invention provides a USB device and a data transfer method thereof. The USB device is coupled to a host and transfers at least one packet to the host. The USB device includes a memory, a USB controller, and a transfer management circuit. The memory stores packets. The USB controller is configured to transfer the packets to the host. The transfer management circuit is coupled between the memory and the USB controller and configured to sequentially read the packets from the memory and sequentially transfer the packets to the USB controller, and to perform the following operations: ending the data transfer when a stored content of the memory does not meet a condition for continuing packet transfer; or ending the data transfer when (Continued)

a last transferred packet meets a preset condition and a next packet that follows the last transferred packet does not meet the preset condition.

6 Claims, 4 Drawing Sheets

(56) References Cited

U.S. PATENT DOCUMENTS

| | | |
|---|---|---|
| 9,274,986 B2 | 3/2016 | Chen et al. |
| 2005/0120150 A1* | 6/2005 | Lissel .................. G06F 3/0607 710/33 |
| 2006/0015660 A1* | 1/2006 | Nguyen ................ G06F 3/0676 710/52 |
| 2014/0258567 A1 | 9/2014 | Chen et al. |

OTHER PUBLICATIONS

OA letter of the counterpart CN application (appl. No. 202010121748.2) dated Aug. 2, 2021. Summary of the OA letter: Claims 1-3, 6-8 are unpatentable over reference 1 (US 2014258567A1), Claims 1-5, 9-10 are unpatentable over reference 1 and reference 2 (CN103875302B).

* cited by examiner

USB DEVICE AND DATA TRANSFER METHOD THEREOF

BACKGROUND OF THE INVENTION

1. Field of the Invention

The present invention generally relates to Universal Serial Bus (USB), and, more particularly, to a USB device and its data transfer method.

2. Description of Related Art

In practical USB applications of transferring the data from the device to the host via USB, an aggregation technique is often used to reduce the number of data transfers, thereby reducing the burden of the host processor (e.g., a central processing unit (CPU), a micro control unit or a microcontroller) and increasing the amount of transferred data per unit time. The device does not transfer data until the host initiates a data transfer.

FIG. 1 shows the contents of one USB transfer according to a conventional transfer mechanism. The host initiates the data transfer at time point T0, and the device starts to transfer packet P1, packet P2, packet P3, . . . in sequence until the accumulated transfer amount reaches a data threshold Dth (i.e., the total data amount of the packets P1, P2, P3, . . . , PN is greater than or equal to the data threshold Dth), and the data transfer ends at time point Te. After receiving packets P1 to PN, the host processes all these N packets. In other words, the USB transfer for one time includes packets P1 to PN. The data threshold Dth can be slightly smaller than the storage upper limit of the host system resource. As to the transfer order, packet P2 is the next packet of packet P1, packet P3 is the next packet of packet P2, and so on.

One of the disadvantages of the mechanism illustrated in FIG. 1 is that almost every packet has a transfer delay. For example, packet P3 has been completely transferred at time point T3, but the host does not process the packets until time point Te. As a result, packet P3 has the transfer delay of at least time length TL3 (TL3=Te−T3). In the event that packet P3 is critical in time (i.e., packet P3 must be sent to the host as early as possible), such a transfer mechanism may have adverse influences on the user experience or reduce the performance of the host.

SUMMARY OF THE INVENTION

In view of the issues of the prior art, an object of the present invention is to provide a USB device and a data transfer method for USB devices, so as to shorten the transfer delay of important packets.

A universal serial bus (USB) device is provided. The USB device is coupled to a host and transfers at least one packet to the host. The USB device includes a memory, a USB controller and a transfer management circuit. The memory is configured to store packets. The USB controller is configured to transfer the packet to the host. The transfer management circuit is coupled between the memory and the USB controller and configured to sequentially read the packets from the memory, to sequentially transfer the packets to the USB controller, and to perform following operations: ending data transfer when a stored content of the memory does not meet a condition for proceeding to transfer more packet(s); or ending the data transfer when a last transferred packet meets a preset condition and a next packet of the last transferred packet does not meet the preset condition.

A data transfer method is provided. The data transfer method is applied to a USB device. The USB device is coupled to a host and transfers at least one packet to the host through a USB controller. The method includes the following steps: sequentially reading packets from a memory and sequentially transferring the packets to the USB controller; and ending data transfer when a stored content of the memory does not meet a condition for proceeding to transfer more packet(s).

A data transfer method is also provided. The data transfer method is applied to a USB device. The USB device is coupled to a host and transfers at least one packet to the host through a USB controller. The method includes the following steps: sequentially reading packets from a memory and sequentially transferring the packets to the USB controller; and ending data transfer when a last transferred packet meets a preset condition and a next packet of the last transferred packet does not meet the preset condition.

According to the present invention, the USB device and the data transfer method for USB devices can end data transfer early when necessary. Compared with the conventional technology, the present invention can improve the user experience and the performance of the host by shortening the transfer delay of important packets that should be processed as immediately as possible.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a Universal Serial Bus (USB) device and a data transfer method thereof. On account of that some or all elements of the USB device could be known, the detail of such elements is omitted provided that such detail has little to do with the features of this disclosure, and that this omission nowhere dissatisfies the specification and enablement requirements. Some or all of the processes of the data transfer method for USB devices may be implemented by software and/or firmware and can be performed by the USB device or its equivalent. A person having ordinary skill in the art can choose components or steps equivalent to those described in this specification to carry out the present invention, which means that the scope of this invention is not limited to the embodiments in the specification.

Figure 1:
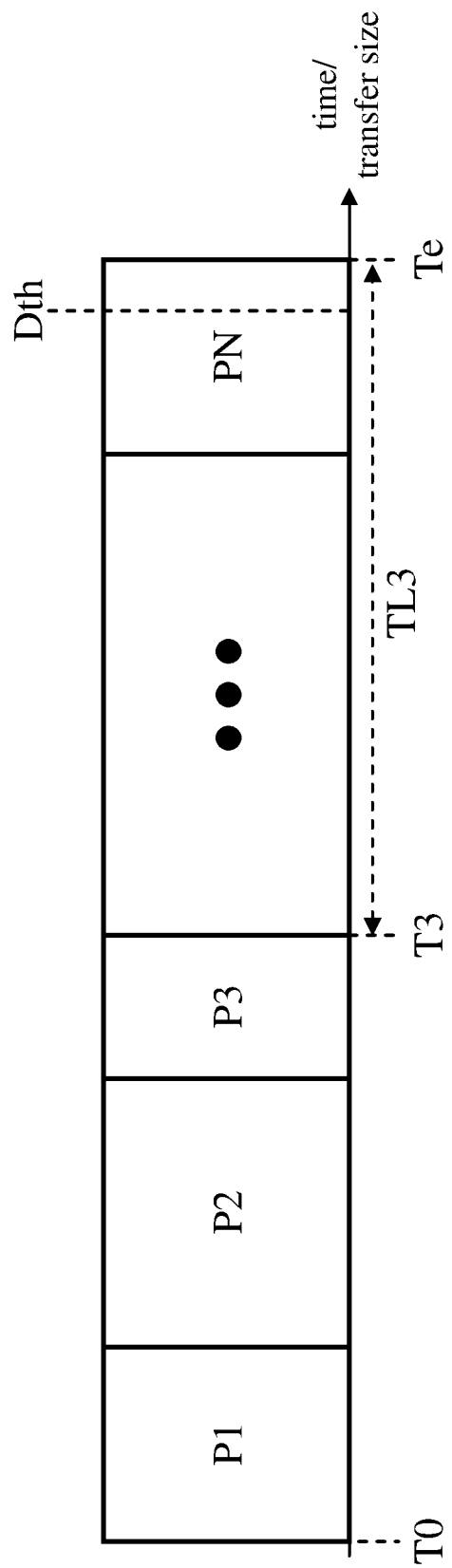
FIG. 1 illustrates the contents of one USB data transfer according to a conventional transfer mechanism.
Figure 2:
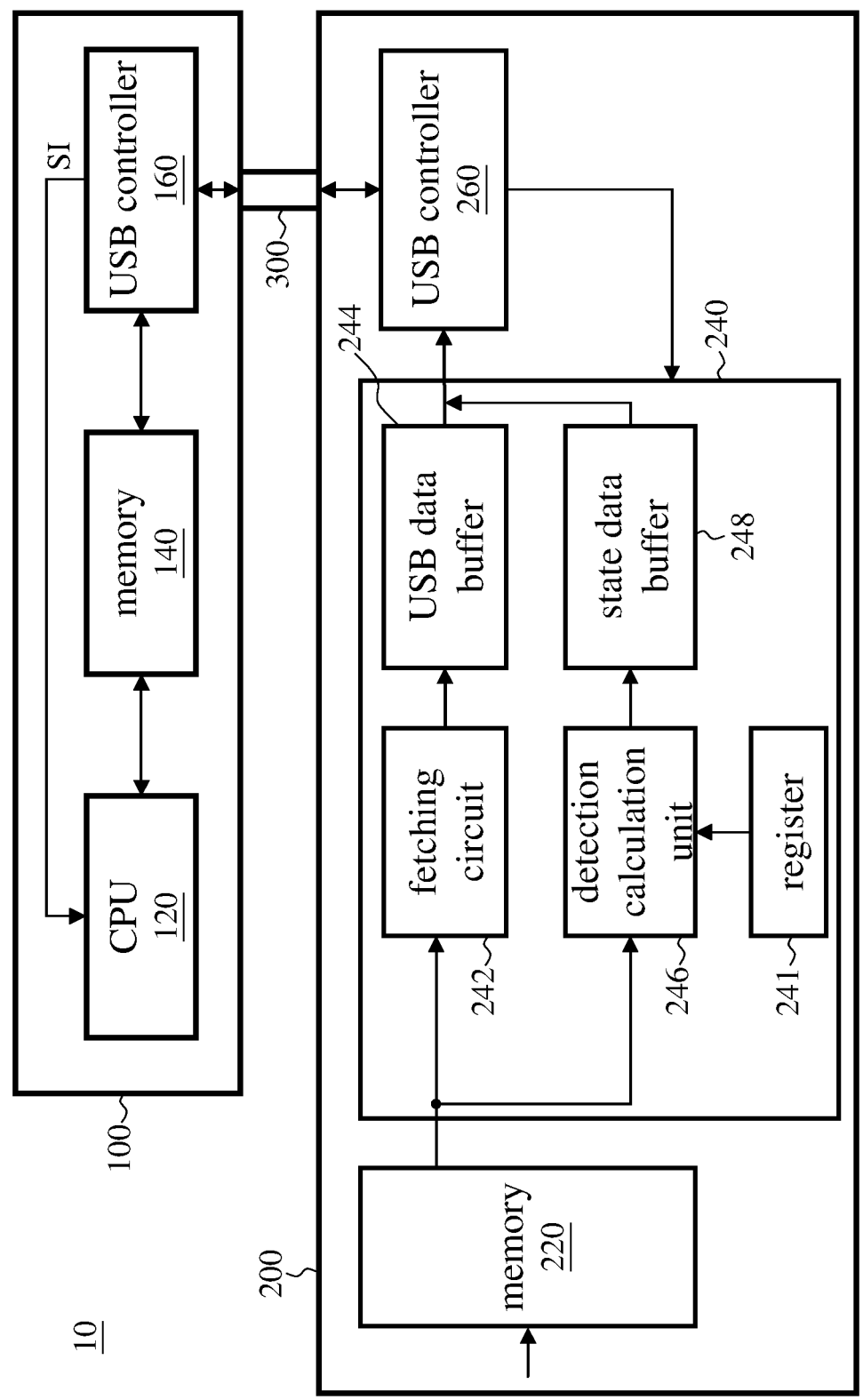
FIG. 2 illustrates a functional block diagram of an electronic device according to an embodiment of the present invention.

FIG. 2 is a functional block diagram of an electronic apparatus according to an embodiment of the present invention. The electronic apparatus 10 (e.g., a server, a desktop computer, a notebook, a tablet, a handheld device, etc.) includes a host 100 and a USB device 200. The host 100 and the USB device 200 transfer data to each other through a USB transfer medium 300 (e.g., a USB cable or USB interface circuit). In some embodiments, the USB device 200 is coupled to the USB downstream port of the host 100. The host 100 includes a central processing unit (CPU) 120, a memory 140 and a USB controller 160. The host 100 uses the USB controller 160 to receive at least one packet from the USB device 200 through the USB transfer medium 300 and stores the received packet in the memory 140. The USB device 200 transfers the packet to the host 100 using the aggregation technique. After learning that the USB device 200 has ended one data transfer (e.g., having received a short packet or its equivalent information from the USB device 200), the USB controller 160 notifies the CPU 120 of the completion of one data transfer through the interrupt signal SI, and the CPU 120 can then read the packets from the memory 140 and process the packets.

The USB device 200 includes a memory 220, a transfer management circuit 240 and a USB controller 260. The memory 220 stores packets sent from the outside of the electronic apparatus 10 to the electronic apparatus 10. In some embodiments, the packets are network packets, and the USB device 200 may be a USB network interface controller (NIC). The transfer management circuit 240 is coupled between the memory 220 and the USB controller 260 and configured to sequentially read the packets from the memory 220 and to sequentially transfer the packets to the USB controller 260. The transfer management circuit 240 includes a register 241, a fetching circuit 242, a USB data buffer 244, a detection calculation unit 246 and a state data buffer 248. The transfer management circuit 240 can be a dynamic aggregation state machine which includes multiple logic gates or logic circuits, and can be implemented, for example, by direct memory access (DMA).

Figure 3:
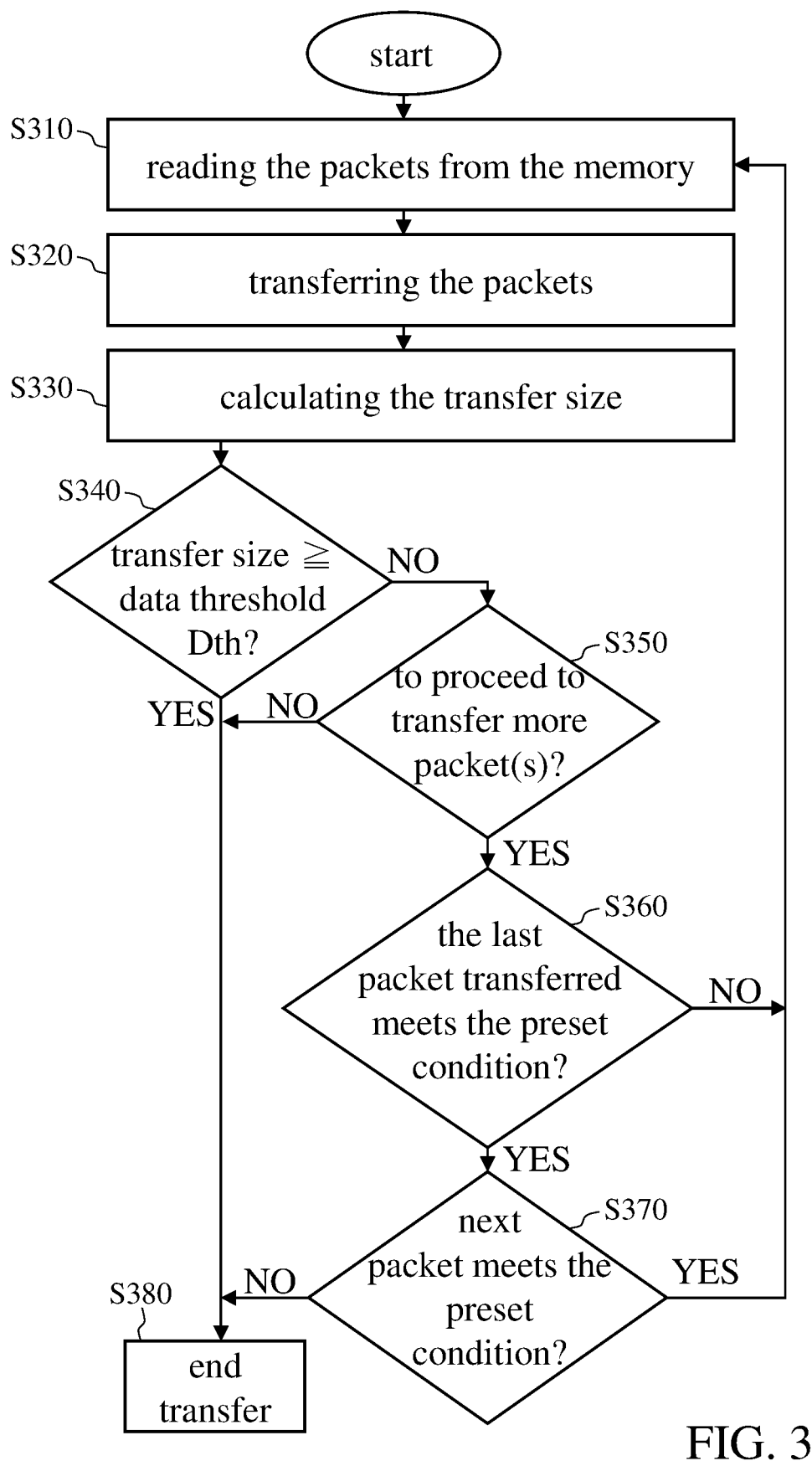
FIG. 3 illustrates a flow chart of a data transfer method according to an embodiment of the present invention.

FIG. 3 is a flow chart of a data transfer method according to an embodiment of the present invention. Reference is made to both FIG. 2 and FIG. 3 for the following discussions. When the host 100 initiates a data transfer, the transfer management circuit 240 starts a bulk-in transfer operation. First, the fetching circuit 242 reads the packets from the memory 220 (step S310). In some embodiments, the memory 220 is a first in first out (FIFO) memory, and the fetching circuit 242 sequentially reads the packets in the order in which the packets are stored in the memory 220. After reading the packets, the fetching circuit 242 stores the packets in the USB data buffer 244. Next, the USB controller 260 fetches the packets from the USB data buffer 244, encapsulates the packets according to the USB standard, and then transfers the packets to the host 100 via the USB transfer medium 300 (step S320). The detection calculation unit 246 is configured to calculate the transfer size of the current data transfer (i.e., the total amount of data having been read from the memory 220 by the fetching circuit 242 after the host 100 initiated the current data transfer) (step S330) and to determine whether the transfer size is greater than or equal to a predetermined data threshold Dth (step S340).

The detection calculation unit 246 also detects the packet size and/or the number of packet(s) currently stored in the memory 220 and determines whether the packet(s) meet a preset condition. In some embodiments, a packet that meets the preset condition may be treated as an important packet (i.e., a packet with a high priority), and transfer delay for the important packets is the smaller the better. This preset condition can be stored in the register 241. In some embodiments, the user can configure the preset condition through the software executed by the host 100. By executing a driver of the USB device 200, the host 100 writes the preset condition to the register 241 of the transfer management circuit 240 via the USB controller 260. The preset condition, for example, may be whether the source port number of the packet falls within a particular range (e.g., 5000 to 5500 of user datagram protocol (UDP)). In one embodiment, when the source port number of the packet falls within this particular range, the packet is treated as the important packet.

Reference is made back to FIG. 3. When step S340 is positive (YES branch), the fetching circuit 242 stops reading the packets from the memory 220 and storing them in the USB data buffer 244. If the length of the last USB packet transferred by the USB controller 260 is less than the maximum USB packet length (this information can be learned from the state data buffer 248), the current transfer is ended (step S380). If the length of the last USB packet transferred by the USB controller 260 is exactly the maximum USB packet length, the detection calculation unit 246 prepares a state data whose USB packet length is zero in the state data buffer 248, and then the USB controller 260 transfers a USB packet of zero length based on this state data to the USB controller 160 to end the current transfer (step S380). More specifically, when the state data buffer 248 stores the state data, the USB controller 260, in response to the state data in the state data buffer 248, completes the transfer of the packet(s) in the USB data buffer 244 and informs the host 100 of the end of data transfer by sending a short packet as the last USB packet. The length of the short packet is less than the maximum packet length specified in the USB specification. When step S340 is negative (NO branch), the detection calculation unit 246 determines whether to proceed to transfer more packet(s) (i.e., whether to proceed to aggregate more packet(s)) (step S350). When step S350 is negative (NO branch), the transfer management circuit 240 immediately ends the bulk-in transfer (step S380). When step S350 is positive (YES branch), the flow proceeds to step S360. In some embodiments, the conditions for proceeding to transfer more packet(s) are, for example: (1) the number of packets in the memory 220 is larger than a predetermined value (e.g., zero); or (2) the packet size in the memory 220 is larger than a predetermined value (e.g., 64 Bytes).

In step S360, the detection calculation unit 246 determines whether the last packet transferred meets the preset condition. When step S360 is negative (NO branch), the flow returns to step S310 in which the fetching circuit 242 proceeds to read the next packet to be transferred from the memory 220. When step S360 is positive (YES branch), the detection calculation unit 246 determines whether the next packet to be transferred, which is stored in the memory 220, meets the preset condition (step S370). When step S370 is positive (YES branch), the fetching circuit 242 performs step S310 to read the next packet from the memory 220.

When step S370 is negative (NO branch), the transfer management circuit 240 immediately ends the transfer (step S380).

Figure 4:
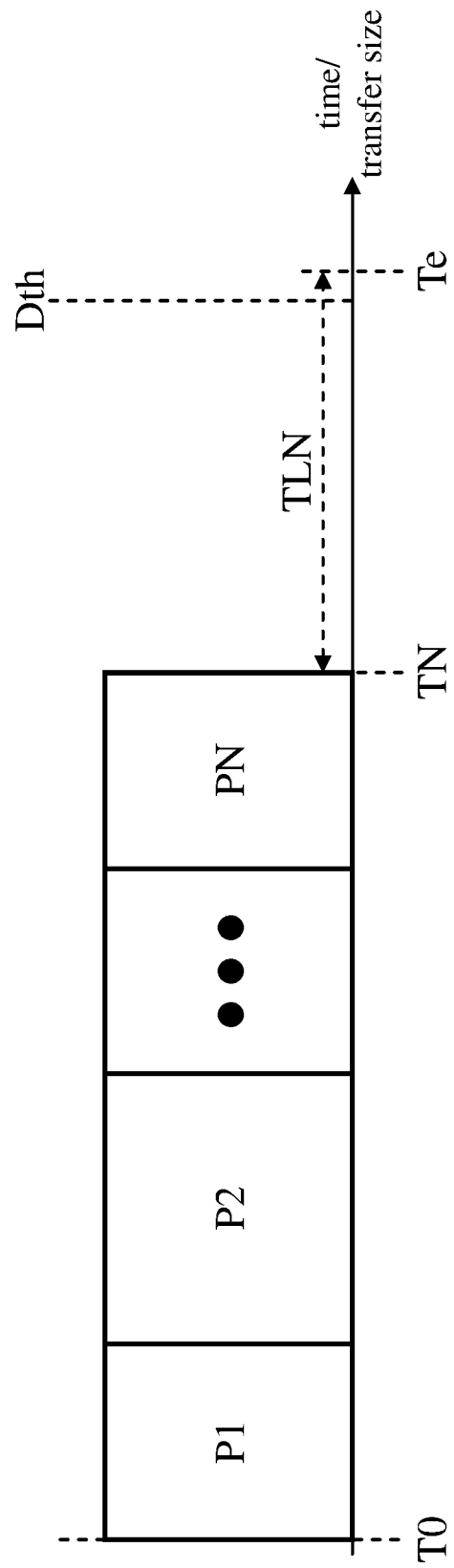
FIG. 4 illustrates an example of the USB data transfer mechanism according to the present invention.

The mechanism of steps S350 to S370 is further illustrated using FIG. 4 as an example scenario. FIG. 4 shows an example of the USB data transfer mechanism of the present invention. It is assumed that at time point TN the total amount of data of packets P1 to PN which have been stored in the USB data buffer 244 is less than the data threshold Dth, and the state (i.e., the stored content) of the memory 220 meets the condition for proceeding to transfer more packet(s) (step S350 being positive); therefore, at time point TN the detection calculation unit 246 determines in step S360 whether the last packet transferred (i.e., packet PN) meets the preset condition. If packet PN is not an important packet (i.e., packet PN does not meet the preset condition), the transfer management circuit 240 proceeds to aggregate more packet(s) (step S310). On the contrary, if the packet PN is an important packet (i.e., the packet PN meets the preset condition), in step S370 the detection calculation unit 246 reads from the memory 220 the next packet that immediately follows packet PN but has not yet been transferred (i.e., has not been stored in the USB data buffer 244 yet) and determines whether the next packet meets the preset condition. If the next packet is not an important packet (step S370 being negative), the transfer is immediately ended (step S380). On the contrary, if the next packet is an important packet (step S370 being positive), the fetching circuit 242 proceeds to read the next packet and stores it in the USB data buffer 244 (step S310).

In summary, the transfer mechanism of the present invention can end data transfer early in the following two scenarios: (1) in the event that, regardless of whether the last transferred packet PN is an important packet, the state of the memory 220 does not meet the condition for proceeding to transfer more packet(s); and (2) in the event that the packet PN is an important packet and the next packet of packet PN is not an important packet. In both scenarios, packets P1 to PN can be processed by the CPU 120 early; that is, the transfer delay of each packet P1 to PN is shorted by the time TLN=Te−TN (N=1, 2, ... ). In other words, the data transfer method of the present invention can reduce the transfer delay of important packets, so that important packets can be processed as early as possible.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A universal serial bus (USB) device, coupled to a host and transferring at least one packet to the host, the USB device comprising:
    a memory configured to store packets;
    a USB controller configured to transfer the packet to the host; and
    a transfer management circuit coupled between the memory and the USB controller and configured to sequentially read the packets from the memory, to sequentially transfer the packets to the USB controller, and to perform following operations:
        ending data transfer when a stored content of the memory does not meet a condition for proceeding to transfer more packet(s); or
        ending the data transfer when a last transferred packet meets a preset condition and a next packet of the last transferred packet does not meet the preset condition;
    wherein the condition for proceeding to transfer more packet(s) is that a total number of the packets in the memory is greater than a first predetermined value or that a packet size of the packets in the memory is greater than a second predetermined value.

2. The USB device of claim 1, wherein the transfer management circuit further performs following operation:
    proceeding to transfer the next packet of the last transferred packet to the USB controller when the last transferred packet and the next packet both meet the preset condition.

3. The USB device of claim 1, wherein the last transferred packet or the next packet of the last transferred packet meets the preset condition when a source port number of the last transferred packet or the next packet falls within a predetermined range.

4. A data transfer method, applied to a universal serial bus (USB) device, the USB device coupled to a host and transferring at least one packet to the host through a USB controller, the method comprising:
    sequentially reading packets from a memory and sequentially transferring the packets to the USB controller; and
    ending data transfer when a stored content of the memory does not meet a condition for proceeding to transfer more packet(s)
    wherein the condition for proceeding to transfer more packet(s) is that a total number of the packets in the memory is greater than a first predetermined value or that a packet size of the packets in the memory is greater than a second predetermined value.

5. A data transfer method, applied to a universal serial bus (USB) device, the USB device coupled to a host and transferring at least one packet to the host through a USB controller, the method comprising:
    sequentially reading packets from a memory and sequentially transferring the packets to the USB controller; and
    ending data transfer when a last transferred packet meets a preset condition and a next packet of the last transferred packet does not meet the preset condition;
    wherein the last transferred packet or the next packet of the last transferred packet meets the preset condition when a source port number of the last transferred packet or the next packet falls within a predetermined range.

6. The method of claim 5, further comprising:
    proceeding to transfer the next packet of the last transferred packet to the USB controller when the last transferred packet and the next packet both meet the preset condition.

* * * * *